3,196,228
ELECTRICAL SOCKET DEVICES, AND ELECTRICAL TEST COUPLINGS INCLUDING PLUG AND SOCKET DEVICES
Brian Frederick Colenutt, Letchworth, England, assignor to The English Electric Company Limited, London, England, a British company
Filed Feb. 26, 1962, Ser. No. 175,889
Claims priority, application Great Britain, Mar. 4, 1961, 7,988/61
4 Claims. (Cl. 200—51.07)

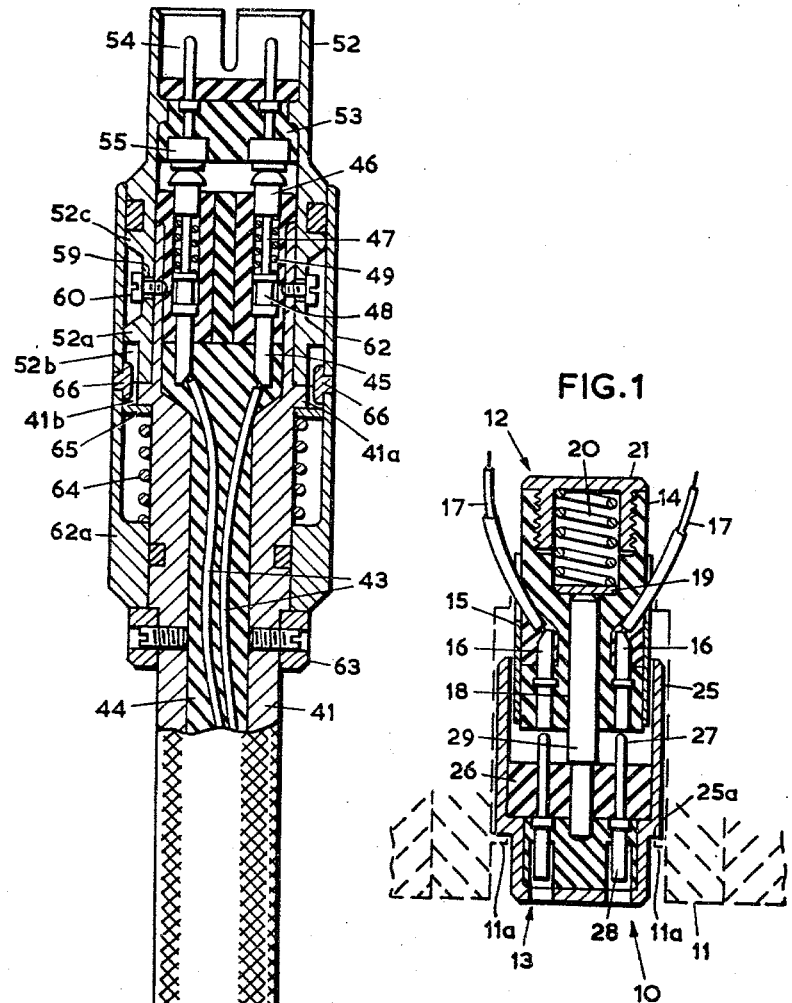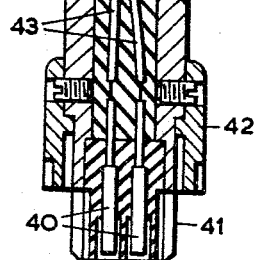

This invention relates to electrical socket devices and in particular to couplings, including plug and socket devices, for testing the electrically initiated explosive systems of guided missiles.

Couplings for testing the electrical circuits, particularly the firing circuits of guided missiles must be designed to minimise the risk of coupling the circuit to electrical sources, e.g. at radio frequnecy, low frequency or power frequency, or direct or static electricity sources and also to minimise the risk of mechanical or electrical mishandling. In addition the test couplings should be designed to reduce as far as possible the required number of test leads, plugs, sockets and adaptors by providing equipment which can be used for a number of different test purposes.

According to the present invention there is provided an electric socket device adapted to cooperate with a plug and having first contact means therein for engagement with contact means on said plug, and second contact means therein, said first and second contact means being mounted for relative movement into and out of engagement with one another in response to movement of the plug into and out of the socket device.

The present invention also provides, in combination with the said socket device whose said first contact means comprise a plurality of contact members, a plug whose contact means comprise an equal number of contact members, said plug having conductor means therein arranged to be selectively engaged with one or more of said contact members of the plug.

One embodiment of the present invention will be now particularly described with reference to the accompanying drawings in which:

FIGURE 1 is a longitudinal section through a field test socket, shown as mounted in the side of a missile, adapted to receive a test probe;

FIGURE 2 is a longitudinal section through a test probe.

As shown in FIG. 1, the test socket 10, which is mounted in a metal housing 11 attached to the skin or external wall of a missile, comprises a first part 12 which is fixed relative to the housing 11 and a second part 13 which is movable along the axis of the socket.

The fixed part 12 comprises a body 14 of synthetic resin plastic or other suitable insulating material contained within a metal sleeve 15 which over the major part of its length is spaced from the housing 11 but at its rearward end makes contact with the housing 11. This body contains a number of contact socket members 16, in this embodiment four, which are connected by conducting leads 17 to various circuits within the missile, in particular the firing circuit components to be tested. Extending axially through the body 14 is an aperture 18 at the bottom of which is a plate 19 urged in a forward direction by a spring 20 mounted in a base member 21.

The second part 13 comprises a metal screening sleeve 25 adapted at its inner end to fit over the sleeve 15, and a body 26 within the sleeve formed of similar insulating material to the body 14 and containing contact pins 27 each directed towards a separate one of the sockets 16 on the opposite of the body, socket members 28 connected to each of the respective pins 27. The outer end part of the sleeve 25 which fits around the sockets 28 is of smaller diameter than the part of the sleeve surrounding the pins 27 so that the outer sleeve of a plug on the end of a test probe can fit between the outer end of the sleeve 25 and the housing 11, whilst pins on the test probe plug engage in the sockets 28.

Extending along the axis of the part 13 and fitting within the aperture 18 is a spigot 29 mounted in the body 26 and at its inner end engaging the plate 19 even when the pins 27 are slightly withdrawn from their corresponding sockets 16. Complete withdrawal of the part 13 from the part 12 is prevented by inwardly directed shoulders 11a on the housing 11 which engage a step 25a in the sleeve 25 formed by the difference in external diameter of the inner and outer parts of the sleeve 25.

It will be evident therefore that even if an electrical supply is applied to the sockets 28, contact with the sockets 16 will not be made until the part 13 of the test socket is pushed axially inwards towards the part 12 to bring the pins 27 into engagement with the sockets 16. The pressure required will be that necessary to overcome the force of the spring 20, and this force may be made sufficiently high to prevent unauthorised handling. In particular the exposed end of the part 13 will have an area corresponding to that of a person's thumb, and the spring pressure may be made sufficiently high to prevent movement of the part 13 by mere thumb pressure.

Again, the sockets 28 are located below the exposed end surface of the part 13, and the mouths of the cavities in which the sockets 28 are located are made sufficiently small to prevent reception by the sockets 28 of radio frequency signals. In particular the area of each of these mouths is less than half a square inch and preferably is of the order of a quarter of a square inch.

The test probe designed to be used with the test socket is illustrated in FIG. 2 and, considered with its axis vertical as shown, comprises at its lower end, a pair of pin sockets 40 for receiving the pins of a plug connected to a test instrument. The sockets 40 are housed within a metal screen housing 41, and a collar 42 surrounds the housing 41 at this end, being spaced from it to receive the screen housing of the plug to be attached thereto. Twin twisted conducting leads 43 extend from the sockets 40 through the elongated housing 41, the leads being rigidly held within a rod of synthetic resin plastic material 44 which forms a rigid core extending through the housing 41 and which may contain carbon or other suitable substances for attenuating radio frequencies. At the upper end of the housing 41, the two leads are attached to terminals 45 which support a pair of contact buttons 46. These contact buttons are mounted on pins 47 which extend into sockets 48 on the contacts 45, the pins being surrounded by helical springs 49 so that the contact buttons 46 are accordingly resiliently mounted.

Embracing the upper end of the housing 41 is a first metal sleeve 52 which extends beyond the upper end of the housing 41 and contains a block of synthetic resin plastic material 53 which supports four contact pins 54 extending above the block as shown in FIG. 2, the opposite face of the block carrying four contact plates 55 each connected to one of the pins 54. These contact plates are disposed at the corners of a square and the sleeve 52 and housing 41 are relatively rotatable about the axis of the probe to bring one or other diagonally opposite pair of contact plates 55 into engagement with the pair of contact buttons 46.

To retain the sleeve 52 on the housing 41, two arcuate slots 59 are provided (only one of which is shown) extending around the sleeve and a screw 60 is passed through each slot into a threaded hole in the housing 41, the length of each slot being such as to permit the sleeve 52 to be rotated sufficiently i.e. normally through 45°, to bring either pair of opposite contact plates 55 into engagement with the contact buttons 46.

Surrounding both the upper end of the housing 41 and the lower end of the sleeve 52 is an outer sleeve 62 which at its upper end fits on an outwardly directed shoulder 52c on the sleeve 52 and at its lower end has an inwardly directed shoulder 62a which fits around the housing 41. This outer sleeve is located in position by means of a collar 63 abutting its lower end, the collar being held on the housing 41 by screws, and by a helical spring 64, located between the sleeve 62 and the housing 41. This spring at one end engages the shoulder 62a and at its opposite end engages a ring 65 which encircles the housing 41 and abuts a shoulder 41a thereon. The outer sleeve 62 is thus at all times urged downwardly by the spring 64.

The shoulder 41a is provided with four slots 41b equally spaced apart around its periphery, and the sleeve 62 has on its inner surface two diametrically opposite studs 66 which engage in one or other of the pairs of opposite slots 41b when the sleeve 62 is urged fully downwards. Thus in this position, the outer sleeve 62 is locked against rotational movement relative to the housing 41.

The studs 66 however are longitudinally elongated to project into two slots 52b formed in a shoulder 52a on the inner sleeve 52, and if the outer sleeve 62 is moved upwards against the force of the spring 64, the studs are moved downwards out of the locking slots 41b. The housing 41 may then be rotated relative to the outer sleeve, and since the studs 66 are in engagement with the slots 52b in the inner sleeve 52, the two sleeves will be locked together. The housing 41 may be rotated until the screws 60 sliding in the slots 59 in the sleeve 52 abut the opposite ends of the slots, this position corresponding to a switch over of the two pairs of contact plates 55 relative to the contact buttons 46. In this position, the studs 66 will be in alignment with the second pair of slots 41b in the shoulder 41a and consequently the spring 64 will urge the sleeve 62 downwards and bring the studs 66 into the slots 41b thereby locking the housing 41 to the sleeve 62 once more to prevent rotation in either direction.

By this arrangement, it will be evident that the two leads 43, and hence the test instrument, can be connected to either of two pairs of conductors at the upper end of the test probe without uncoupling and recoupling the test probe as a whole. This is advantageous not only from the mechanical point of view, but also in that the screening of the various parts of the coupling can remain unbroken during the tests.

It will be evident that on coupling the test probe to the test socket shown in FIG. 1 the sleeve 52 will fit the exposed end of the sleeve 25 of the test socket, and as the sleeve 52 advances, the pins 54 will engage in the sockets 28. On advancing the sleeve 52 still further, it will engage against the step 25a of the sleeve 25 and further pressure will move the part 13 of the test socket axially to bring the pins 27 into engagement in the sockets 16. Contact between the sleeve 52 of the test probe and the sleeve 25 of the test socket will be made before the pins 27 engage the socket 16 so that any static electricity present on the surface of the test equipment will be conducted to earth through the skin of the missile. Similarly on withdrawing the test probe, the contact between the pins 27 and socket 16 will be broken before the test probe comes out of contact with the test socket.

The screen housing of the test probe and test socket as well as other parts connected thereto must mate conductively not only to provide this earth connection but also to provide complete screening of the leads between the test instrument and the missile components under test. It is desirable that this screen should be maintained at a low standard resistance and the test leads at a nominal resistance for test purposes.

Whilst the apparatus has been described above as having two conducting leads in the probe connectable selectively with four conducting leads in the socket device, it will be evident that the number of leads can be increased or reduced as desired. In particular the probe may have eight pins to be selectively coupled with two leads in the probe.

I claim:
1. An electric socket device comprising
   a fixed portion having a first body of insulating material defining a central bore with a recess in one end thereof
   a spring at least partially located in said recess and
   a plurality of first sockets embedded in said insulating material adjacent the other end thereof,
   a movable portion comprising a second body of insulating material,
   a spigot secured to said second body of insulating material extending through the central bore in said first body of insulating material and abutting said spring whereby said movable portion is movable towards said fixed portion in response to pressure applied to said second body of insulating material effective to cause axial movement of said spigot in one direction to compress said spring, and is movable away from said fixed portion in response to the release of said pressure effective to cause the restoring force of said spring to move said spigot axially in the opposite direction,
   a like plurality of contact members embedded in said second body of insulating material, each of said contact members comprising
   a pin for engaging with and disengaging from a corresponding first socket in said fixed portion in response to the said movement of the movable portion and
   a second socket contiguous with said pin, said second body of insulating material having a like plurality of cavities therein each having a closed bottom end from which extends a corresponding one of said second sockets, and a mouth, the exposed ends of said second sockets remote from said pins lying substantially below the mouths of said cavities and the area of said mouths being only slightly greater than the cross-sectional area of said second sockets disposed therein.

2. The combination with a socket device according to claim 1, of a plug for engaging with said socket device, said plug comprising
   first and second portions, and
   means mounting said portions for rotation relative to one another about an axis lying along the direction in which the plug is moved to engage with said socket device, said first portion containing two pairs of pins for engagement with corresponding pairs of said plurality of second sockets in said socket device, and said second portion containing two conductors selectively engageable with one or other of said pairs of pins in response to said relative rotation of the first and second portions.

3. An electric plug and socket device, comprising a plug and a socket, said plug comprising
   a first portion,
   contact means mounted in said first portion, and an electrically conductive screen surrounding said first portion, said socket comprising
   first contact means having a first part, and a second part for engagement with the contact means on said plug,
   second contact means, and
   means mounting said first and second contact means for relative movement towards and away from one another in response to engagement and disengagement of said second part of the first contact means with said contact means on said plug whereby said first part of the first contact means moves into and out of engagement with said second contact means, said contact means on said plug and said second part of the first contact means comprising a plurality of interengageable pin and socket members, and the mounting means in said socket comprising an insulating block having a like plurality of blind cavities from the inner end of each of which extends a corresponding one of said members of the first contact means, the exposed ends of said members lying substantially below the mouths of the corresponding cavities and the area of said mouths being small whereby the reception of radio frequency signals by said members of the first contact means is prevented, an electrically conductive screen surrounding and secured to said insulating block and making area contact with the electrically conductive screen on said plug upon engagement of said second part of the first contact means with the contact means on said plug, a central spigot secured to said insulating block, a further insulating block for supporting said second contact means and having a central bore for the passage therethrough of said spigot and resilient compressible means having one end secured in fixed relation to said further insulating block and another end in engagement with said spigot for normally biassing said first contact means, through said spigot, away from said second contact means.

4. A plug and socket device according to claim 3, said plug comprising a second portion, means mounting the second portion for rotation relative to said first portion and a plurality of conductor means in said second portion selectively engageable with predetermined ones of said members in the first portion in response to said rotation.

References Cited by the Examiner
UNITED STATES PATENTS

| 1,043,759 | 11/12 | Fisher | 200—51 |
| 2,432,476 | 12/47 | Hesse | 200—153 |
| 2,980,770 | 4/61 | Nabstedt | 200—11 |
| 2,986,613 | 5/61 | Figueira | 200—51 |
| 3,046,515 | 7/62 | Appleton | 200—51 |

FOREIGN PATENTS 627,714   8/49   Great Britain.

ROBERT K. SCHAFFER, *Acting Primary Examiner.*

BERNARD A. GILHEANY, *Examiner.*